Figure 1:
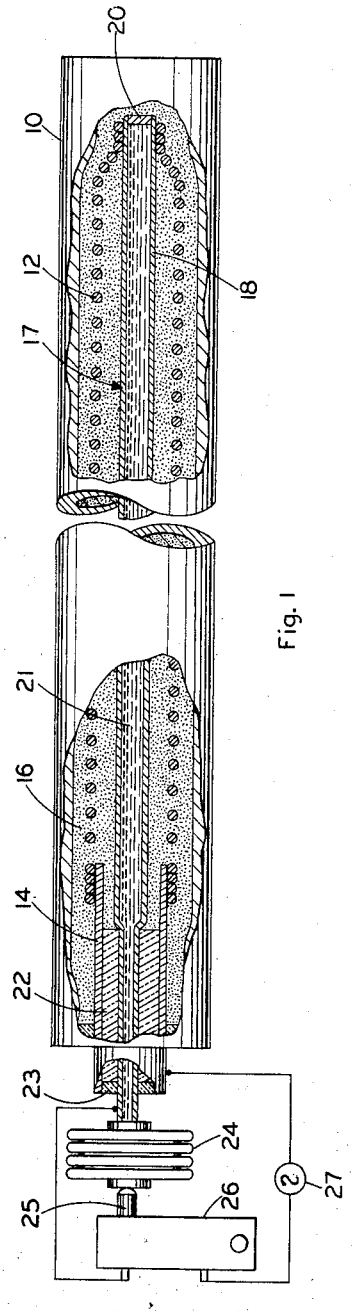

Oct. 13, 1959     A. J. ALOI     2,908,793

TEMPERATURE CONTROL ELECTRIC HEATING DEVICE

Filed July 17, 1958

INVENTOR.
Anthony J. Aloi
BY *M W Goodwin*

His Attorney

United States Patent Office 2,908,793
Patented Oct. 13, 1959

2,908,793

TEMPERATURE CONTROL ELECTRIC HEATING DEVICE

Anthony J. Aloi, Shelbyville, Ind., assignor to General Electric Company, a corporation of New York Application July 17, 1958, Serial No. 749,178

2 Claims. (Cl. 219—26)

This invention relates to an electric resistance heater having an integral temperature sensing element for actuating an electrical control for the heater and more particularly to such a resistance heater element wherein the temperature sensing element is a vessel filled with a fluid which will undergo volume changes in response to changes in temperature and wherein the volume change of the fluid is utilized to actuate a fluid pressure responsive element which in turn actuates an electrical switch in the electrical control circuit for the heater.

It is an object of this invention to provide a temperature control electric resistance heater of novel and improved construction which will provide rapid response to changes in heater temperature and which is of relatively simple and economical construction.

It is a further object of this invention to provide a temperature controlled electric heater having a novel and improved arrangement of a hollow resistance heating element and a temperature sensing element containing fluid which will undergo changes in volume in response to changes in temperature whereby temperature overload protection for the heating element is provided along substantially the entire length thereof and whereby the overall fabrication of the heater is simplified and facilitated.

Other objects and advantages of my invention will be in part obvious and in part pointed out in more detail hereinafter.

In one aspect of my invention I provide a sheathed electric heater comprising a hollow sheath or casing within which is concentrically disposed a helical resistance wire heating element embedded in insulating material. A hollow cylindrical member sealed at one end is disposed substantially concentrically within the heating element, in electrically insulated relation thereto, with one end of the cylindrical member being mechanically and electrically connected to the corresponding end of the heating element. A fluid pressure responsive switch actuating element is disposed at the other end of the cylindrical member in communication with the interior thereof, and the cylindrical member is filled with a fluid which will undergo volume change in response to changes in temperature. The end of the cylindrical member adjacent the pressure responsive element and the corresponding end of the heating element are adapted to be connected to a source of electrical power with either the heating element or cylindrical member being connected through an electrical switch actuated by the pressure responsive element. In my heater constructed and connected as described, the center cylindrical member and the fluid therein provide a temperature sensing element extending the full length of the heating element with the center cylindrical member also serving as an electrical return lead for the heating element.

Figure 2:
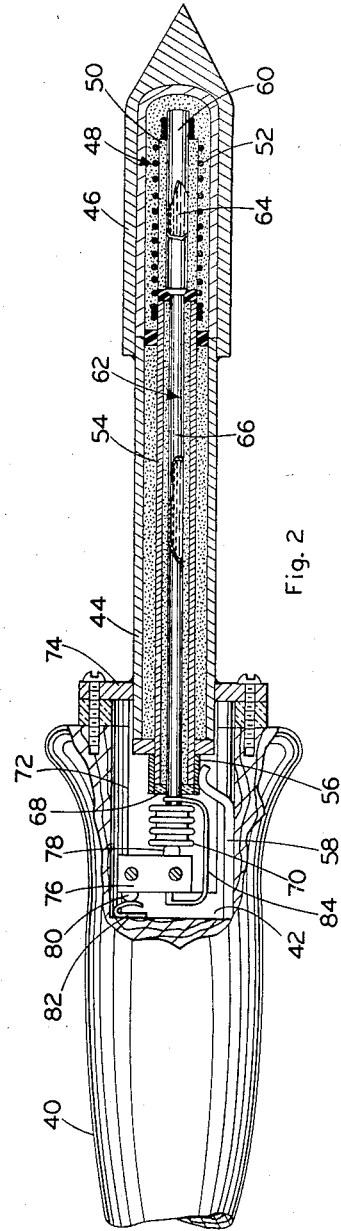

A more detailed understanding of my invention may be had from a consideration of the following description taken in connection with the accompanying drawing in which:

Fig. 1 is a fragmentary side view, partly in section, of a sheathed electric resistance heater embodying the present invention; and Fig. 2 is a fragmentary side view, partly in section, of an electric soldering iron embodying the present invention.

With reference to Fig. 1 of the drawing my invention is shown incorporated in a sheathed heater comprising an elongated hollow cylindrical casing or sheath 10 in which is disposed an elongated hollow heating element in the form of a helical resistance wire coil extending longitudinally of the sheath in radially inwardly spaced relation thereto. One end of the heating element is supported on a metal tube or terminal 14 extending coaxially within one end of the heater, and the heating element is embedded and electrically insulated from the sheath by insulating material 16, such as compacted magnesium oxide.

In accordance with my invention, a temperature sensing element 17 is disposed within the heating element and extends longitudinally thereof. The sensing element 17 comprises an elongated hollow cylindrical metal member or tube 18 sealed at one end such as by the disc 20 and disposed coaxially within the heating element in radially inwardly spaced relation. The tube 18 is reduced in cross section at its outer end to form a capillary section and the tube and capillary are filled with a fluid 21, such as mercury or glycerine having the characteristic of undergoing volume change in response to changes in temperature and is insulated from the heating element by the insulating material 16. The inner end of the heating element is mechanically and electrically connected to the corresponding end of the tube 18 with the other or outer end of the tube 18 opposite the sealed end thereof extending outwardly of the heater through a ceramic insulating sleeve 22 concentrically received within the terminal 14. An insulating washer 23 seals the outer end of tube 14 and electrically insulates the tube 14 from the tube 18. A fluid pressure responsive switch actuating element, in the form of a bellows 24 is mounted on the outer end of the tube 18 in communication with the interior of the tube. The bellows 24 is filled with the fluid 21, as is schematically shown in the drawing, is engageable with a plunger 25 of an electrical switch 26 adapted to be connected between a power source 27 and the outer end of the tube 18. The other side of the power source is adapted to be connected to the terminal 14 and thus the other or outer end of the heating element 12 to complete the electrical circuit for the heater.

In the operation of a heater embodying my invention, the temperature sensing element 17 will provide very sensitive temperature control of the heater to regulate energizing and deenergizing thereof in response to falling or raising of the heater temperature below and above a predetermined value. The temperature sensing element 17 constructed and arranged within the heating element as shown and described affords the distinct advantage of providing temperature control throughout the length of the heating element, thus being responsive to any hot spots in the heater which might not be sensed if the sensing element were located only along a portion of the heater. In this connection the temperature sensing element 17 protects the heater against temperature build-up on the sheath because of surface defects due to misuse of adverse operating conditions or because of scale or film deposits built up on the sheath. This temperature sensitivity throughout substantially the entire length of the heater also provides a low liquid level protecting feature in the event that the heater is used as an immersion heater inasmuch as when the liquid in which the heater is immersed falls below a certain level, the then exposed portion of the heater sheath will operate at a higher temperature due to the loss of the cooling effect of liquid. It should, of course, also be noted that the tube 18 also serves as the electrical return lead for the inner end of the heating element thus providing a very compact and economical structure. The arrangement of the sensing element 17 and heating element 12, as shown and described, permits the assembly of these elements prior to final swagging of the heater, as is a known practice for compacting the insulating material 16, when the same is granular magnesium oxide or the like, thus facilitating and simplifying the manufacture of the heater. Also, in a heater constructed in accordance with my invention, heating elements of a higher power rating than would normally be used in a given installation can be used to obtain rapid initial heating and substantially instantaneous recovery, inasmuch as the high sensitivity and rapid response of the sensing element 17 will control de-energizing or energizing of the heater without fear of temperature overtravel in either direction. In this latter connection, there is an additional advantage to the use of heating elements having power rating larger than would normally be used in that the number of heaters required for certain applications may be reduced, and also the larger wire size of the higher rated heating elements facilitate handling and assembly of the heating element during manufacture of the heater thus improving the overall ease of manufacture.

With reference to Fig. 2 of the drawing, my invention is shown embodied in a soldering iron comprising a hollow handle 40 having a recess 42 at one end. An elongated hollow metal tube 44 forming the shank of the iron extends at one end into the recess 42 and is rigidly secured to the handle. A tip 46 is mounted on the outer end of the shank and disposed concentrically within the outer end of the shank is a resistance heating element 48 comprising a core or former 50 on which is helically wound a resistance wire heating element 52. The inner end of the coil 52 is mechanically and electrically connected to a metal tube or terminal 54 disposed within the shank and extending longitudinally thereof and outwardly of the inner end of the shank and into the recess 42 in the handle. A metal tube or sleeve 56 is engaged over the protruding end of the tube 54 and is engageable with an electrical contact 58 on the handle adapted to be connected to a power source for the heater.

The core or former 50 is provided with a central bore in which is received an enlarged portion or sensing bulb 60 of a temperature sensing element 62 disposed within the tube 54 and extending longitudinally thereof. The outer end of the coil 52 is mechanically and electrically connected to the outer end of the sensing bulb which projects beyond the core 50. The sensing element 62 further comprises a capillary tube 66 extending from the sensing bulb 60 through the shank and outwardly of the inner end of the tube 54 and projects into the recess 42 in the handle. An insulating washer 68 electrically insulates the tubes 54 and 56 from the capillary tube 66. Mounted on the inner end of the capillary tube is a fluid pressure responsive element, which in the specific embodiment is a bellows 70, which communicates with the interior of the capillary tube. The sensing bulb is of hollow construction and it, as well as the capillary tube and bellows, is filled with a fluid 64, such as nitrogen, having the characteristic of undergoing a volume change in response to changes in temperature. If desired, the sensing bulb and capillary may be partially filled with a fluid, such as kerosine, whereby the vapor pressure of the kerosine will actuate the bellows in response to ambient temperature changes. It should, of course, be understood that a fluid, such as mercury, could be used in the embodiment of Fig. 2 as well as that of Fig. 1 and that the embodiment of Fig. 1 could utilize fluids, such as nitrogen or kerosine, in the same manner as the embodiment of Fig. 2.

A mounting plate 72 fixed to a flange 74 mounting the shank 44 on the handle 40 carries a switch 76 having a plunger 78 engageable by the bellows 70. The switch is preferably adjustably mounted on the mounting plate to permit factory preadjustment of the switch relative to the bellows. The switch is provided with a contact 80 engageable with a contact 82 on the handle, which in turn is adapted to be connected to a source of power for the iron. An electrical connection 84 leads from the switch 76 to the capillary tube 66 whereby the sensing element 62 provides an electrical return lead for the outer end of the heating element 48.

During operation of the soldering iron embodying my invention, the sensing element 62 will effect energizing and deenergizing of the heating element when the tip temperature falls below or goes above a predetermined value. The rapid initial heat-up and substantially instantaneous recovery characteristics of the first described embodiment of Fig. 1 are also present in the embodiment of Fig. 2. For this reason the soldering iron tip may be of lesser mass than is normally required inasmuch as there is little if any dependence upon the tip for the storage of heat during use of the iron. The mounting of the switch and bellows integrally with the shank 44 permits final adjustment of the switch and bellows prior to assembly of the shank and handle, and the location of the switch and bellows within the handle, as described, precludes inadvertent readjustment of the switch and bellows during use. Also, the construction and arrangement of the sensing bulb 60 within the heating element 48 rather than in a recess in the tip separate from the heating element, as has heretofore been accomplished, permits and facilitates changing and placing of the tip, if desired, without disturbing the controls for the iron.

It will be understood that many changes could be made in the construction heretofore shown and described and that different embodiments of my invention could be made without departing from the scope thereof. Particularly, it should be noted that the bellows 24 and 70 are shown only by way of example and that as will be apparent to those skilled in the art other suitable fluid pressure responsive elements could be substituted therefor. Accordingly, the foregoing description and drawing should be taken only in an illustrative sense and not as limiting my invention, it being my intention that the invention here described shall be limited only by the terms of the appended claims which shall include within their scope or structure that which logically falls within the language of the claims.

What I claim as new and desire to secure by Letters Patent of the United States is:

1. In a sheathed electric resistance heater of the temperature controlled type, an elongated hollow sheath, a helical wire resistance heating element disposed within the sheath and extending longitudinally thereof in radially spaced electrically insulated relation, an electrical terminal connected to one end of the heating element and extending from a corresponding end of the sheath, an elongated metal tube sealed at one end and extending coaxially of and within the heating element substantially over the entire length of the heating element and in radially spaced electrically insulated relation thereto, the sealed end of the tube being disposed adjacent and being mechanically and electrically connected to the end of the heating element opposite said one end of the heating element so that the tube provides an electrical return lead for the heating element extending from one said end of the heating element back through the heating element, the end portion of said tube opposite said sealed end thereof being provided with a reduced cross section, a fluid pressure responsive actuating element connected to the end of said tube opposite said sealed end in communication with the interior of the tube, a quantity of fluid which will undergo volume change in response to changes in temperature thereof disposed in said tube, and means to connect said terminal and said tube to a source of electrical power including an electric switch actuated by said actuating element for controlling energizing of the heating element.

2. In a soldering iron having a hollow handle, an elongated hollow shank extending outwardly from one end of the handle, a tip supported on the outer end of the shank and a hollow resistance heating element for the tip disposed within the shank adjacent said tip and extending longitudinally of the shank and tip in electrically insulated relation thereto, an elongated temperature sensing bulb extending coaxially of and within the heating element, the end of said bulb further from the handle being mechanically and electrically connected to the corresponding end of said heating element, a capillary tube connected at one end to the end of said bulb more closely adjacent said handle and extending longitudinally of and through the shank and into said handle, switch means within the handle including a fluid pressure responsive switch actuating element connected to the end of the capillary tube extending into the handle, a quantity of fluid which will undergo volume change in response to changes in temperature thereof disposed within the bulb and capillary tube, the sealed end of said bulb being electrically connected to the end of said heating element farther from the handle, and means to electrically connect the end of the capillary tube extending into the handle and the end of said heating element more closely adjacent the handle to a source of electrical power including an electrical switch disposed within the handle and actuated by said actuating element.

References Cited in the file of this patent

UNITED STATES PATENTS

| | | |
|---|---|---|
| 1,373,411 | Clark | Apr. 5, 1921 |
| 2,228,956 | Helland | Jan. 14, 1941 |
| 2,456,030 | Sohns | Dec. 14, 1948 |
| 2,816,202 | Lennox | Dec. 10, 1957 |